PATENTED JUL 13 1971

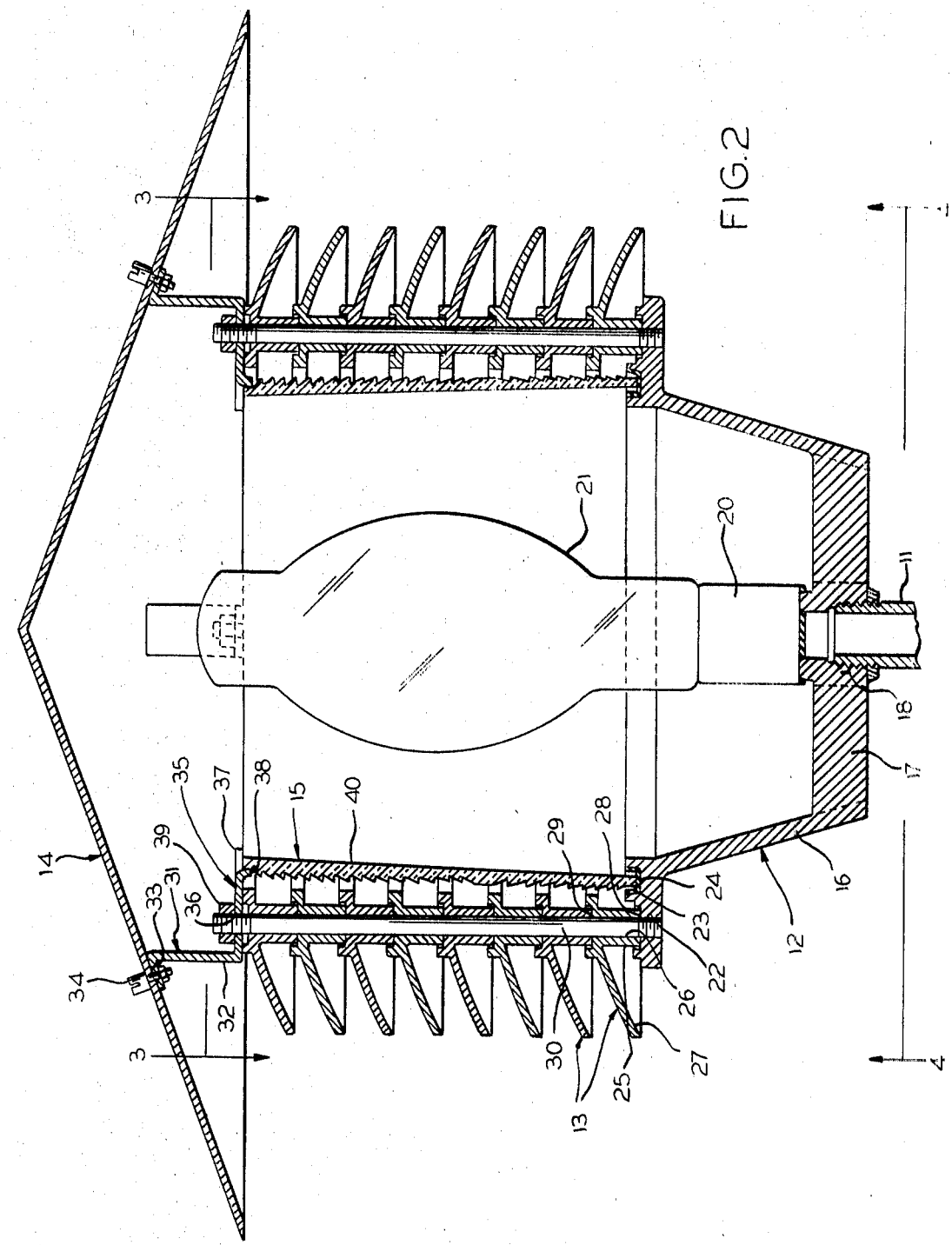

3,593,015

INVENTOR.
Joseph R. Marchant
BY
W.A. Schuetz
ATTORNEY

HEADLAMP WASHER PUMP

The present invention relates to a washer system for sequentially squirting washer fluid onto a plurality of spaced transparent surface areas of an automotive vehicle, and more particularly to a headlamp washer system in which washer fluid is sequentially squirted onto a plurality of headlamps of the vehicle.

In known headlamp washer systems the washer fluid is simultaneously squirted onto a plurality of headlamps of a vehicle to clean the same. The fluid is directed from a washer pump by a main conduit and then branch conduits to nozzles located adjacent the headlamps to be cleaned. Such systems are shown in U.S. Pat. No. 3,117,727, issued Sept. 1, 1964, and in copending application, Ser. No. 834,042, filed June 17, 1969 and assigned to the same assignee as the present invention.

Although these known headlamp washer systems have operated in a very satisfactory manner, they nevertheless have a drawback. Should one of the nozzles become clogged, a greater portion of the washer fluid will be delivered to the headlamp or headlamps having the unclogged nozzle or nozzles and the pressure buildup behind the clogged nozzle may not be sufficient to self-purge this nozzle. The washer system of the present invention overcomes or substantially overcomes this drawback by sequentially delivering the washer fluid from the pump to individual ones of the nozzles such that each nozzle receives a predetermined portion of the washer fluid at full pump pressure. Thus, if one or more of the nozzles is clogged, the washer fluid from the pump cannot be diverted to the other nozzles and this causes a much higher pressure buildup behind the clogged nozzle which tends to dislodge any foreign material therefrom. Another advantage of the washer system of the present invention is that the washer fluid is supplied to each of the nozzles at a greater pressure than would be the case if the outlet of the pump were connected to each of the nozzles simultaneously.

Accordingly, an important object of the present invention is to provide a new and improved headlamp washer system which overcomes the above-noted drawback of the prior headlamp washer systems by sequentially delivering the washer fluid from the washer pump onto a plurality of headlamps of a vehicle.

Another object of the present invention is to provide a new and improved headlamp washer system in which the outlet of the pump means is in communication with an inlet of a valve means having a plurality of outlet ports which are connected to individual ones of nozzles positioned adjacent the headlamps of the vehicle, and in which the valve means includes a valve member operatively connected with the pump means and which is operable in response to operation of the pump means to sequentially uncover the outlet ports of the valve means too sequentially deliver a full pressure squirt of washer fluid against each of the headlamps.

Yet another object of the present invention is to provide a new and improved headlamp washer system having a reciprocable piston pump wherein the piston is moved through its discharge stroke by a vacuum-operated actuator and moved through its intake stroke by a spring means when the vacuum pressure is removed from the actuator, and wherein the valve means includes a valve member connected with the piston and constructed and arranged such that it sequentially uncovers outlet ports connected to individual ones of the nozzles so that the washer fluid from the pump is sequentially squirted onto a plurality of headlamps of the vehicle.

The present invention further resides in various novel constructions and arrangement of parts, and further objects novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which.

Figure 1:
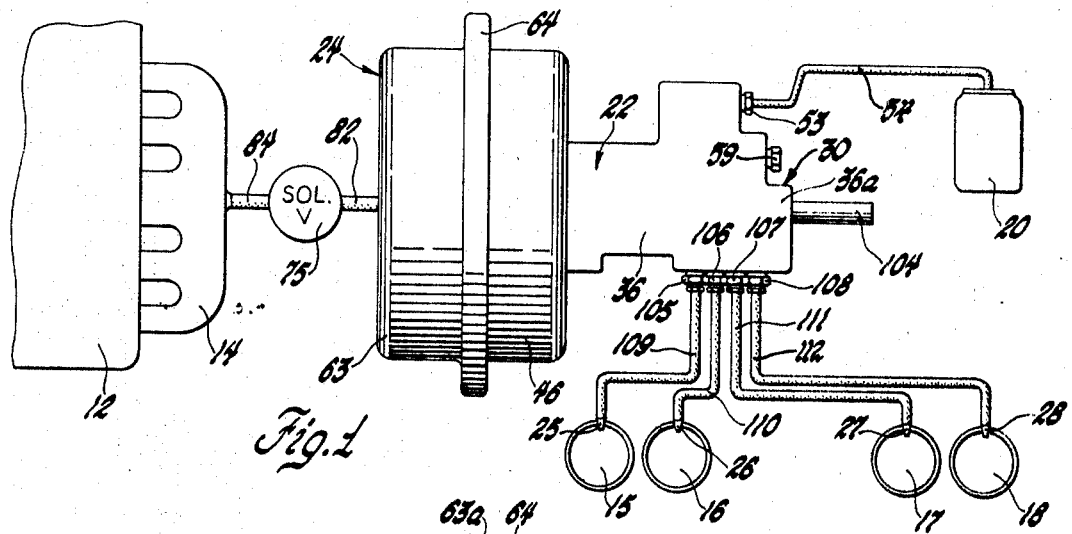
FIG. 1 is a schematic view of the washer system of the present invention and its relation to an automotive vehicle.

The present invention provides a washer system for sequentially squirting washer fluid onto a plurality of spaced transparent surface areas of an automotive vehicle. Although the washer system of the present invention could be used for sequentially squirting washer fluid onto various different transparent areas of a vehicle, such as the windshield and rear window of a vehicle, it is particularly susceptible for use as a headlamp washer system for sequentially squirting washer fluid onto a plurality of headlamps of a vehicle. Accordingly, the washer system of the present invention will be described and illustrated as being used for the latter purpose.

The washer system of the present invention is adapted to be carried within an engine compartment (not shown) of an automotive vehicle. The vehicle includes an engine 12 having an intake manifold 14 and a plurality of headlamps 15—18, preferably four headlamps, which would be located at the forward end of the vehicle.

The washer system broadly comprises a reservoir 20 for containing a supply of washer fluid; a pump means 22 for pumping washer fluid under pressure; a selectively operable, vacuum responsive, actuator means 24 for operating the pump means 22; a plurality of nozzles 25—28 respectively positioned adjacent the headlamps 15—18; and a valve means 30 for controlling communication between the pump means 22 and the nozzles 25—28. The valve means 30 is operatively connected with the pump means 22 and functions to sequentially communicate the nozzles 25—28 with the pump means 22 when the latter is operated so that washer fluid is delivered sequentially to the headlamps 15—18.

Figure 2:
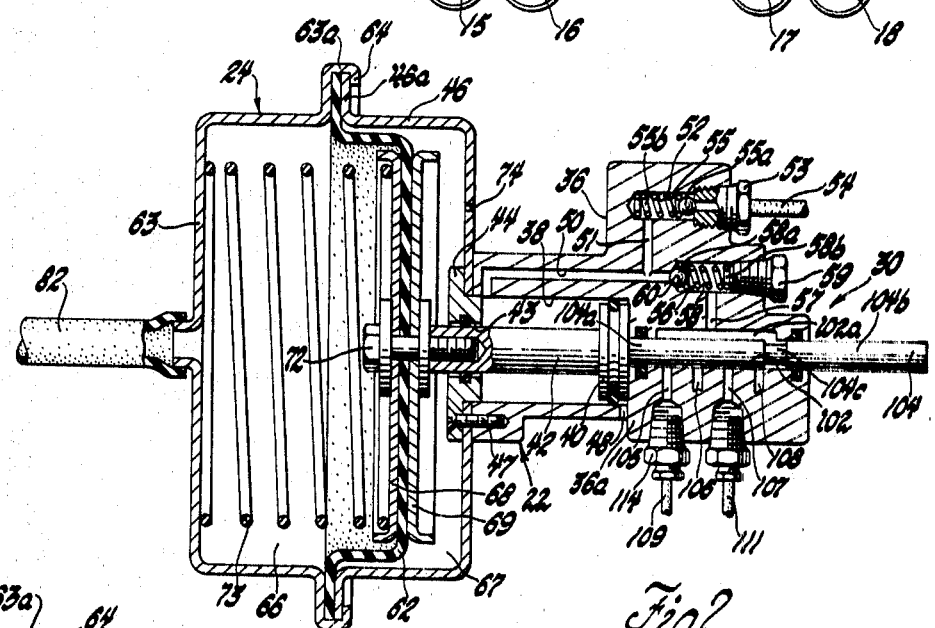
FIG. 2 is an enlarged cross-sectional view of part of the washer system shown in FIG. 1.

The pump means 22 comprises a main pump housing 36 having a cylindrical chamber 38 adjacent its left end, as viewed in FIG. 2. The chamber 38 slidably receives a reciprocable pumping member in the form of a piston 40. The piston 40 is integrally connected at one side with a piston rod 42 which extends through an opening 43 and an end cap 44. The end cap 44 clampingly engages the inner surface of a cup-shaped housing member 46 of the actuating means 24 and it is bolted to the cup-shaped housing member 46 and the main pump housing 36 by screws 47. The end cap 44 defines with the main pump housing 36 the chamber 38, the latter being vented to the atmosphere at the right side of the piston, as viewed in FIG. 2, via a bleed hole 48.

The pump means 22 has a combined inlet and outlet passage 50 which is in communication with the chamber 38 at its left end, as viewed in FIG. 2. The passage 50 is in communication with the reservoir 20 via passages 51, 52, nipple 53 and conduit 54. Disposed within the passage 52 is a spring-biased ball check valve 55, the ball 55a of which is normally biased by its associated spring 55b into engagement with the nipple 53 to prevent communication between the conduit 54 and the passage 52. The passage 50 is also in communication with the valve means 30 via passages 56 and 57. The passage 56 is of an enlarged diameter and has a spring-biased ball check valve 58 disposed therein. The spring 58b of the spring-biased check valve seats against one end of a plug 59 threadably secured to the main housing 36 and normally biases its associated ball 58a against a seat 60 formed at the juncture of the passages 50 and 56 to prevent communication between the passages 50 and 56.

Figure 3:
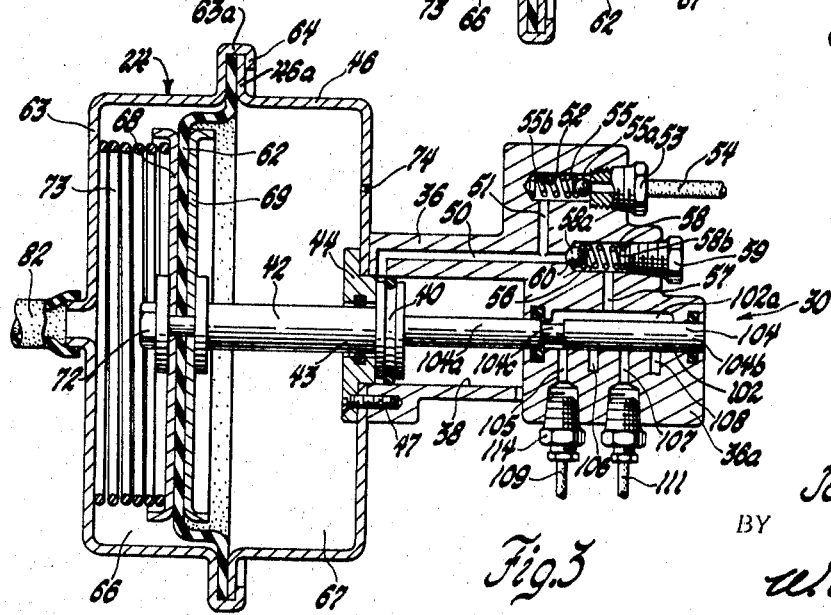
FIG. 3 is a cross-sectional view like that shown in FIG. 2 but showing different parts thereof in different positions.

The pump member 40 of the pump means is movable through intake and discharge strokes. The pumping member 40 is moved through its intake stroke when moved from its leftwardmost portion, as shown in FIG. 3, toward its rightwardmost position, as shown in FIG. 2. During this movement washing fluid is drawn from the reservoir 20 via conduit 54, nipple 53, past check valve 55 and passages 52, 51 and 50 into the chamber 38. The pumping member 40 is at the end of its intake stroke when in the position shown in FIG. 2 and is normally maintained in this position so as to be in a charged condition.

The pumping member 40 is moved through its discharge stroke when moved from right to left from its position shown in FIG. 2 toward its position shown in FIG. 3. During this movement washing fluid in the chamber 38 is forced out through the passage 50 past the check valve 58 into the passage 56 and thence into the passage 57 toward the valve means 30.

The pumping member 40 is moved through its intake and discharge strokes by the actuating means 24. The actuating means 24 comprises a resilient diaphragm 62 having its outer peripheral edge clamped between a peripheral flange 46a on the housing member 46 and a peripheral flange 63a of a cup-shaped member 63. The flange 63a of the cup-shaped member 63 is crimped onto the flange 46a of the cup-shaped member 46 as shown at 64. The cup-shaped members 46 and 63 together define a cylindrical housing and the diaphragm 62 divides the housing into left and right chambers 66 and 67, respectively. The diaphragm 62 has a pair of rigid plates 68 and 69 on its opposite sides and the plates 68 and 69 and the diaphragm 62 are secured to the left end of the piston 42 by a bolt 72.

The diaphragm 62 is normally biased toward its position, as shown in FIG. 2, in which it holds the piston 40 at the end of its intake stroke so that the pump means 22 is in a charged condition by a compression spring 73. The compression spring 73 has one end in abutting engagement with the bottom of the cup-shaped member 63 and its other end in abutting engagement with the plate 68.

The diaphragm 62 is movable from its position, as shown in FIG. 2, toward its position shown in FIG. 3 to move the piston 40 through its discharge stroke in response to vacuum pressure being applied to the chamber 66. When vacuum pressure is removed from the chamber 66, the compression spring 73 will return the diaphragm 62 from its position shown in FIG. 3 toward its position shown in FIG. 2 during which the piston 40 moves through its intake stroke. A bleed hole 74 in the bottom of the cup-shaped member 46 continually vents the chamber 67 to the atmosphere.

Operation of the vacuum-actuating means 24 is controlled by an electrically energizable solenoid valve 75. The solenoid valve 75 could be of any suitable or conventional construction and would be in an operative electrical circuit with the vehicle battery, the ignition switch and a manually operable switch located on the instrument panel of the vehicle. The solenoid valve 75 has an outlet which is in communication with an inlet to the chamber 66 via a conduit 82 and an inlet which is in communication with the inlet manifold of the vehicle via a conduit 84.

In accordance with the provisions of the present invention the washer fluid discharged from the pump means 22 during movement of the piston 40 through its discharge stroke is sequentially delivered to the headlamps 18, 17, 16 and 15 so that each headlamp receives a full pressure jet of cleaning fluid each time the pump means 22 is operated. This is accomplished, in accordance with the provisions of the present invention, by the valve means 30. The valve means 30 includes a housing portion 36a which is formed integral with the main pump housing 36 of the pump means 22. Thus, the valve means 30 and pump means 22 have a common housing. The housing portion 36a has a cylindrical chamber 102 formed therein adjacent its right end which slidably receives a valve member 104. The chamber 102 includes an arcuate, circumferentially extending recess portion 102a which is in communication with the passage 57. The recess portion 102a forms an inlet for the valve means 30. The valve means 30 also has four outlet ports, 105, 106, 107, 108 which are respectively connected to the nozzles 25—28 via conduits 109—112, respectively. Each of the conduits 109—112 is connected to outlets of the housing portion 100 via nipples 114.

The valve member 104 is in the form of a piston rod which is connected to the right side of the piston 40. The valve member has a pair of spaced lands 104a and 104b and an intermediate annular recess 104c.

When the pump means is not being operated and the piston 40 is at the end of its intake stroke, as viewed in FIG. 2, the land 104a covers all four of the outlet ports 105—108 and thus, blocks communication between the pump means 22 and the nozzles 25—28.

When the solenoid valve 75 is energized to communicate vacuum pressure to the chamber 66 of the actuating means 24, the diaphragm 62 is caused to be moved toward the left which in turn causes the piston 40 to be moved through its discharge stroke. As the piston 40 moves through its discharge stroke the fluid in chamber 38 is forced through passageway 50 past the check valve 58 and via passages 56 and 57 to the inlet 102a of the valve means 30. At the same time as the piston 40 is being moved toward the left the valve member 104 is moved toward the left. As the latter is moved toward the left it first uncovers the port 105 to communicate the outlet of the pump to the nozzle 28 via recess 104c to deliver a charge of cleaning fluid against the headlamp 18. As the valve member 104 moves further towards the left the land 104b will block the outlet port 108 and the recess 104c will communicate the inlet of the valve means 102a with the nozzle 27 to deliver cleaning fluid onto the headlamp 17 and then sequentially to headlamps 26 and 25.

When the solenoid valve 75 is deenergized the spring 73 will cause a diaphragm 62 to be moved toward the right which in turn will cause the piston 40 to be moved through its intake stroke. During movement of the piston 40 through its intake stroke washer fluid or solution will be drawn from the reservoir 20 into the chamber 38. When the piston is at the end of its intake stroke, as shown in FIG. 2, the land 104a of the valve member 104 will again be in a position in which it blocks all four of the ports 105-108.

From the foregoing, it can be seen that the headlamp washer system of the present invention sequentially delivers a full pressure charge of washer fluid against each of the headlamps of the vehicle. The advantages of the instant washer system is that each of the nozzles receives a full pressure charge of cleaning fluid rather than a partial pressure charge as would be the case if each of the nozzles received the washer fluid simultaneously. Additionally, it should be apparent that each of the nozzles will tend to self-purge itself of any foreign material or corrosion, since the fluid pressure therebehind will increase when the nozzle is clogged or partially clogged.

Although the illustrated embodiment thereof has been described in great detail, it should be apparent that certain modifications, changes, and adaptations may be made in the illustrated embodiment, and that it is intended to cover all such modifications, changes and adaptations which come within the spirit of the present invention.

What I claim is:

1. A washer system for sequentially squirting washer fluid onto a plurality of spaced surface areas of an automotive vehicle comprising: a reservoir for containing a supply of washer fluid; pump means including a movable pumping member for pumping washer fluid under pressure, said pump means having an inlet in communication with said reservoir and an outlet through which washer fluid under pressure is emitted; means for energizing said pump means, a valve means having an inlet in communication with the outlet of said pump means and a plurality of spaced outlet ports; a plurality of nozzle means which are adapted to be located adjacent respective ones of the plurality of transparent surface areas, individual ones of said nozzles being in communication with individual ones of said outlet ports, said valve means including a movable valve member which is operatively connected with said pumping member and operable in response to movement of said pumping member, when said pump means is energized, to sequentially uncover individual ones of said outlet ports to sequentially squirt washer fluid onto said plurality of transparent surface areas.

2. A headlamp washer system for sequentially squirting washer fluid onto a plurality of spaced headlamps of an automotive vehicle comprising: a reservoir for containing a supply of washer fluid; a pump means including a movable pumping member for pumping washer fluid under pressure, said pump means having an inlet in communication with said reservoir and an outlet, means for energizing said pump means, a valve means having an inlet in communication with the outlet of said pump means and a plurality of spaced outlet ports; nozzle means adapted to be positioned adjacent each of the headlamps and with individual ones of the nozzle means being respectively connected with individual ones of the outlet ports of the valve means, said valve means including a valve member which is connected with said movable pumping member and which is movable in response to operation of the pump means to sequentially uncover said outlet ports to sequentially provide a full pressure squirt of washer fluid onto each of the headlamps.

3. A headlamp washer system for sequentially squirting washer fluid onto a plurality of headlamps of an automotive vehicle comprising: a reservoir for containing a supply of washer fluid; pump means including a reciprocable pumping member for pumping washer fluid under pressure, said pump means having an inlet in communication with the reservoir and an outlet; said pumping member being movable through an intake stroke in which it draws washer fluid from the reservoir into a pumping chamber and a discharge stroke, fluid motor means operatively connected with said pumping member for effecting movement of said pump member through its discharge and intake strokes, a valve means having an inlet in communication with the outlet of said pump means and a plurality of spaced outlet ports, nozzle means adapted to be positioned adjacent the headlamps to be washed and with individual ones of the nozzle means being respectively connected to individual ones of said outlet ports, said valve means including a valve member connected to said pumping member and which is reciprocably movable with said pumping member to sequentially uncover said outlet ports to sequentially provide a full pressure squirt of washer fluid onto each of said headlamps in response to movement of said pumping member through its discharge stroke.

4. A headlamp washer system as defined in claim 3 wherein said pumping means and said valve means have a common housing; and wherein said fluid motor is a vacuum-operated fluid motor.

5. A headlamp washer system as defined in claim 3 wherein said pump means comprises a pump housing having a cylindrical chamber therein, said pumping member is a piston slidably received within said chamber and said valve member is a spool having an annular recess intermediate its ends for sequentially communicating the inlet of the valve means with said outlet ports when moved.

PO-1050
(5/69)

UNITED STATES PATENT OFFICE
CERTIFICATE OF CORRECTION

Patent No. __3,593,015__          Dated __August 31, 1971__

Inventor(s) __JOSEPH R. MARCHANT__

It is certified that error appears in the above-identified patent and that said Letters Patent are hereby corrected as shown below:

Column 4, line 61, before "surface" insert -- transparent --

Signed and sealed this 22nd day of February 1972.

(SEAL)
Attest:

EDWARD M. FLETCHER, JR.
Attesting Officer

ROBERT GOTTSCHALK
Commissioner of Patents